United States Patent Office 2,759,001
Patented Aug. 14, 1956

2,759,001
PROCESS FOR THE PRODUCTION OF Δ²-OXAZOLINES

George W. Moersch, Detroit, and Allen C. Moore, Grosse Pointe Woods, Mich., assignors to Parke Davis & Company, Detroit, Mich., a corporation of Michigan No Drawing. Application March 1, 1952,
Serial No. 274,502

6 Claims. (Cl. 260—307)

This invention relates to a process for the production of Δ²-oxazoline compounds. More particularly, the invention relates to a process for the production of Δ²-oxazoline compounds having the formulae,

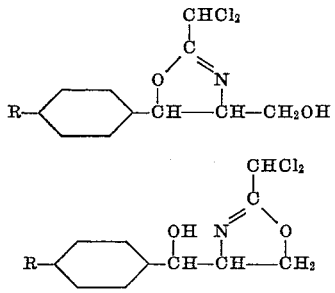

where R is a hydrogen, halogen, nitro, lower alkoxy or phenyl substituent.

It will be appreciated by those skilled in the art that the above compounds as well as the starting materials used in their production can exist in structural or diastereoisomeric as well as in optical isomeric forms. The diastereoisomeric forms are herein referred to as the "threo" (pseudo) and the "erythro" (regular) forms, respectively. Each of these diastereoisomers can exist as racemates of optically active isomers, thus giving a total of six different forms. Because of the difficulty of representing these different forms in graphic formulae, the customary structural formulae will be used in both the specification and claims and a notation placed below or to the side of the formula to designate the particular structural and optical configuration of the compound. Where the formula represents the unresolved mixture of the structural and optical isomers, the notation "unresolved" will be used. However, it should be expressly understood that where no notation appears with a structural formula the formula is to be interpreted in its generic sense, that is, as representing the D-threo, L-threo, D-erythro or L-erythro isomers in separated form as well as the DL-threo or DL-erythro optical racemates or the total unresolved mixture of structural and optical isomers. Such a formula does not merely represent the unresolved mixture of isomers.

In the past oxazoline compounds having the above formulae wherein R is hydrogen or a nitro group have been prepared by the reaction of a dichloroacetimino alkyl ether hydrohalide with a 1-phenyl- or 1-p-nitrophenyl-2-aminopropane-1,3-diol. However, this method suffers the disadvantage that the preparation of the dichloroacetimino alkyl ether hydrohalides from dichloroacetonitrile is quite difficult and costly. Moreover, the instability of the dichloroacetimino alkyl ether hydrohalides makes it necessary to utilize them promptly in the process.

One of the objects of the present invention is to provide a method for the production of Δ²-oxazoline compounds having the above formulae which obviates the necessity of preparing and utilizing the unstable dichloroacetimino alkyl ether hydrohalides as starting materials.

In accordance with the invention, this object and other objects which will become apparent hereinafter are realized by reacting dichloroacetonitrile with an amino diol compound of formula,

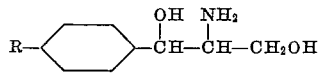

under such conditions that the Δ²-oxazoline compounds so produced undergo little or no hydrolysis; where R has the same significance as given above. Best results are obtained when the reaction is carried out under anhydrous conditions, that is, without a solvent or in an anhydrous organic solvent, because under these conditions no hydrolytic decomposition of the products takes place. However, if desired, aqueous solvents can also be employed but in this instance the temperature and duration of the reaction must be controlled to obtain the best yields of the desired Δ²-oxazoline compounds. As solvents, lower aliphatic ketones, lower aliphatic alcohols, cyclic ethers, aqueous mixtures of the aforementioned solvents, halogenated lower aliphatic hydrocarbons and the like can be employed. Some specific examples of such solvents are acetone, methanol, aqueous methanol, ethanol, aqueous ethanol, isopropanol, aqueous isopropanol, dioxane, aqueous dioxane, tetrahydrofurane and chloroform.

The reaction is effected at a relatively low temperature, that is, below about 100° C. in most instances. The preferred temperature for the reaction is within the range of 20 to 75° C. When low reaction temperatures such as 20 to 30° C. are used the reaction is usually complete within several days, while at higher temperatures (60–65° C.) the reaction proceeds rapidly and is complete within a few hours. If an aqueous solvent is used as the reaction medium the reaction should be discontinued after about three days at 25 to 30° C., about twenty-four hours at 50° C. and about six hours at 70° C. in order to minimize hydrolysis of the Δ²-oxazoline products.

The relative quantities of the reactants are not particularly critical, but in practice an excess of the cheaper and more readily available dichloroacetonitrile is usually employed.

The reaction product consists of a mixture of the 2-dichloromethyl-4-hydroxymethyl-5-R-substituted phenyl-Δ²-oxazoline and the corresponding 2-dichloromethyl-4-R-substituted phenylhydroxymethyl-Δ²-oxazoline. This mixture can be separated into its components by fractional crystallization from an organic solvent such as methanol, methanol-isopropanol mixture, methanol-petroleum ether mixture, ethanol, ethanol-petroleum ether mixture, ethylene dichloride and the like. When the erythro diastereoisomer of the amino diol compound is used as the starting material, the reaction product is composed of 2-dichloro-4-R-substituted phenylhydroxymethyl - Δ² - oxazoline together with very minor amounts of the corresponding 2-dichloromethyl-4-hydroxy-methyl-5-R-substituted phenyl Δ²-oxazoline. However, when the threo diastereoisomer of the amino diol compound is used as the starting material, the reaction product contains approximately equal amounts of both of the isomeric oxazolines.

The products produced by the process of the invention are useful as therapeutic agents per se or as intermediates in the production of other organic compounds possessing valuable therapeutic properties.

The invention is illustrated by the following examples.

Example 1

(a) A solution consisting of 100 g. of D-(—)-threo-1-p-nitrophenyl-2-aminopropane-1,3-diol, 60 g. of dichloroacetonitrile and one liter of methanol is heated under reflux for four hours. The reaction mixture is cooled and the crystalline product consisting of a mixture of D-(—)-threo-2-dichloromethyl-4-hydroxymethyl - 5-p-nitrophenyl-Δ²-oxazoline and D-(—)-threo-2-dichloromethyl-4-p-nitrophenylhydroxymethyl - Δ² - oxazoline collected; yield 87 g. Further concentration of the reaction mixture filtrate yields an additional 34 g. of this mixed product. The mixed product is carefully recrystallized from methanol to obtain as a first crop 45 g. of D-(—)-threo-2-dichloromethyl - 4 - p-nitrophenylhydroxymethyl - Δ²-oxazoline; M. P. 142–3° C.; $(\alpha)_D = -180.0°$ (c.=4.13% in ethyl acetate). The methanol filtrate is evaporated to dryness and the residue taken up in and crystallized from isopropanol to obtain 38 g. of D-(—)-threo-2-dichloromethyl-4-hydroxymethyl-5-p-nitrophenyl - Δ² - oxazoline; M. P. 133–4° C.; $(\alpha)_D = -16.0°$ (c.=3.2% in ethyl acetate).

(b) 200 g. of D-(—)-threo-1-p-nitrophenyl-2-aminopropane-1,3-diol, 120 g. of dichloroacetonitrile and 2 liters of methanol are mixed and stirred for five days at room temperature. The solid is filtered off to yield 222 g. of the mixed isomers (75%). Recrystallization from methanol gives crude D-(—)-threo-2-dichloromethyl-4-p-nitrophenylhydroxymethyl-Δ²-oxazoline (115 g.) and the residue after evaporating to dryness and recrystallization from isopropanol yields 75 g. of crude D-(—)-threo-2-dichloromethyl-4-hydroxymethyl-5-p-nitrophenyl - Δ²-oxazoline. A second recrystallization in each case from the appropriate solvent raises the melting points of the isomeric products to 140–2° and to 133–4°, respectively.

*Example 2*

A mixture consisting of 100 g. of DL-threo-1-p-nitrophenyl-2-aminopropane-1,3-diol, 60 g. of dichloroacetonitrile and one liter of methanol is allowed to stand at room temperature for approximately six days. The solvent is evaporated and the residue crystallized from methanol to give DL-threo-2-dichloromethyl-4-p-nitrophenylhydroxymethyl-Δ²-oxazoline; M. P. 163–164° C.; yield 77 g. Upon evaporating the mother liquors from this crystallization to dryness and fractionally crystallizing the residue from a mixture of methanol and ethyl acetate and finally from benzene, DL-threo-2-dichloromethyl-4-hydroxymethyl-5-p-nitrophenyl-Δ² - oxazoline is obtained; M. P. 128–129° C.; yield 35 g.

*Example 3*

15 g. of DL-erythro-1-p-nitrophenyl-2-aminopropane-1,3-diol, 8 g. of dichloroacetonitrile and 100 cc. of methanol are allowed to stand in admixture with occasional shaking for two days and the resulting crystals are filtered off to give 16 g. of DL-erythro-2-dichloromethyl-4-p-nitrophenylhydroxymethyl-Δ²-oxazoline; M. P. 167–168° C.; yield 74%. By concentrating the mother liquors and crystallizing the solid from a mixture of ethyl acetate and ethyl alcohol an additional 2 g. of this compound is obtained, representing a further yield of 10 per cent.

*Example 4*

A mixture consisting of 4.2 g. of D-(—)-threo-1-p-nitrophenyl-2-aminopropane-1,3-diol, 2 cc. of dichloroacetonitrile and 50 cc. of a 2 to 3 methanol-water mixture is heated under reflux for one hour and then allowed to stand overnight at 25° C. Filtration of the reaction mixture yields 1.9 g. (35% yield) of a mixture of the desired isomeric oxazolines; M. P. 100–105° C. Fractional crystallization of this product from methanol yields the desired D-(—)-threo-2-dichloromethyl-4-hydroxymethyl-5-p-nitrophenyl-Δ²-oxazoline (M. P. 135–6° C.) and D-(—)-threo-2-dichloromethyl-4-p - nitrophenylhydroxymethyl-Δ²-oxazoline (M. P. 142° C.) in pure form.

*Example 5*

A mixture consisting of 110 g. of DL-threo-1-(4'-biphenylyl)-2-aminopropane-1,3-diol, 60 g. of dichloroacetonitrile and two liters of methanol is stirred at room temperature for five days. The solid is filtered off and recrystallized from methanol to obtain the desired DL-threo-2-dichloromethyl-4 - (4' - biphenylyl) - hydroxymethyl-Δ²-oxazoline. Evaporation of the crystallization filtrate and recrystallization of the residue from isopropanol yields the desired DL-threo-2-dichloromethyl-4-hydroxymethyl-5-(4'-biphenylyl)-Δ²-oxazoline.

What we claim is:

1. Process for the production of Δ²-oxazoline compounds having the formulae,

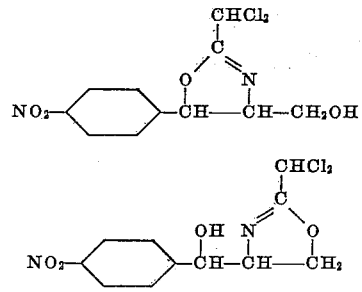

which comprises reacting dichloroacetonitrile with an amino diol of formula,

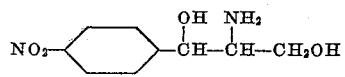

under anhydrous conditions.

2. Process for the production of D-(—)-threo-2-dichloromethyl-4-hydroxymethyl-5-p-nitrophenyl - Δ² - oxazoline and D-(—)-threo-2-dichloromethyl-4-p - nitrophenylhydroxymethyl-Δ²-oxazoline which comprises reacting dichloroacetonitrile with D-(—)-threo-1-p-nitrophenyl-2-aminopropane-1,3-diol under anhydrous conditions.

3. Process for the production of DL-threo-2-dichloromethyl - 4 - hydroxymethyl - 5 - p - nitrophenyl - Δ²-oxazoline and DL - threo - 2 - dichloromethyl - 4 - p - nitrophenylhydroxymethyl - Δ² - oxazoline which comprises reacting dichloroacetonitrile with DL - threo - 1 - p-nitrophenyl - 2 - aminopropane - 1,3 - diol under anhydrous conditions.

4. Process which comprises mixing dichloroacetonitrile and an amino diol compound of formula

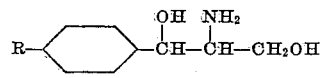

in anhydrous methanol at a temperature between 20° and 75° C. for a time greater than 4 hours thereby precipitating from the reaction mixture a crystalline product containing a Δ²-oxazoline having one of the formulae

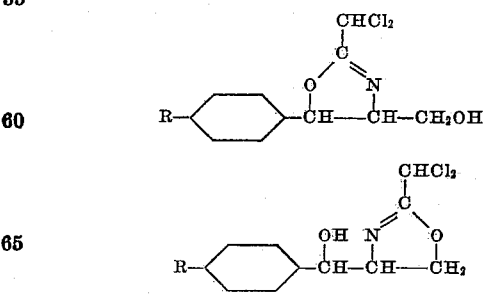

where R is a member of the class consisting of hydrogen, halogen, nitro, lower alkoxy and phenyl radicals.

5. Process which comprises reacting dichloroacetonitrile with an amino diol compound of formula,

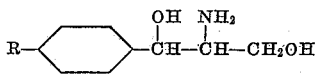

under anhydrous conditions at a temperature below 100°

C. thereby producing Δ²-oxazoline compounds having the formulae,

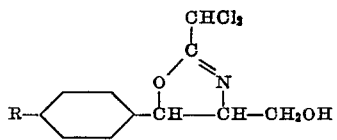

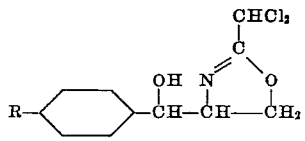

where R is a member of the class consisting of hydrogen, halogen, nitro, lower alkoxy and phenyl radicals.

6. Process which comprises reacting dichloroacetonitrile with an amino diol compound of formula,

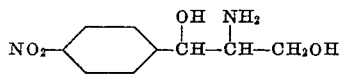

in an anhydrous organic solvent at a temperature below 100° C. thereby producing Δ²-oxazoline compounds having the formulae,

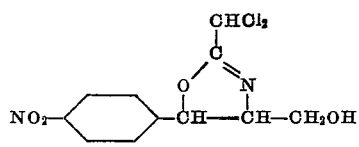

References Cited in the file of this patent

UNITED STATES PATENTS

| | | |
|---|---|---|
| 2,402,198 | Loder | June 18, 1946 |
| 2,513,346 | Moersch et al. | July 7, 1950 |
| 2,562,114 | Moersch et al. | July 24, 1951 |
| 2,692,897 | Moersch | Oct. 26, 1954 |

FOREIGN PATENTS

| | | |
|---|---|---|
| 275,968 | Switzerland | Oct. 1, 1951 |

OTHER REFERENCES

Chem. Reviews, vol. 44, June 1949, pp. 457–59.